(12) United States Patent
Li et al.

(10) Patent No.: US 11,353,088 B2
(45) Date of Patent: Jun. 7, 2022

(54) CHAIN UNIT SEALED AND LUBRICATED WITH MAGNETIC FLUID AND CHAIN HAVING SAME

(71) Applicant: Tsinghua University, Beijing (CN)

(72) Inventors: Decai Li, Beijing (CN); Yanwen Li, Beijing (CN); Siyu Chen, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 0 days.

(21) Appl. No.: 17/507,520

(22) Filed: Oct. 21, 2021

(65) Prior Publication Data
US 2022/0128123 A1 Apr. 28, 2022

(30) Foreign Application Priority Data

Oct. 28, 2020 (CN) .......................... 202011173662.0
Oct. 28, 2020 (CN) .......................... 202022440647.X

(51) Int. Cl.
 *F16J 15/43* (2006.01)
 *F16G 13/06* (2006.01)
 *F16G 15/12* (2006.01)
(52) U.S. Cl.
 CPC ............. *F16G 13/06* (2013.01); *F16G 15/12* (2013.01); *F16J 15/43* (2013.01)
(58) Field of Classification Search
 CPC ............ F16J 15/43; F16G 13/06; F16G 15/12
 See application file for complete search history.

(56) References Cited

U.S. PATENT DOCUMENTS

| 5,269,729 A * | 12/1993 | Thuerman ............... F16G 13/06 474/207 |
| 5,459,993 A | 10/1995 | Kuriyama et al. |
| 2008/0161147 A1* | 7/2008 | Nakagawa ............ F16G 13/06 474/207 |

(Continued)

FOREIGN PATENT DOCUMENTS

| CN | 201795050 | 4/2011 |
| CN | 104482213 | 4/2015 |
| CN | 206592521 | 10/2017 |

(Continued)

OTHER PUBLICATIONS

CNIPA, First Office Action for CN Application No. 202011173662.0, dated Apr. 25, 2021.

(Continued)

*Primary Examiner* — Vishal A Patel
(74) *Attorney, Agent, or Firm* — Hodgson Russ LLP

(57) ABSTRACT

A chain unit lubricated and sealed with magnetic fluid includes a pin shaft, a magnetic sleeve, a first pole piece and a second pole piece. The sleeve is fitted over an outer periphery of the pin shaft. Both ends of the pin shaft protrude from the sleeve. A first gap exists between an inner peripheral surface of the sleeve and an outer peripheral surface of the pin shaft. The first pole piece is arranged at one of the sleeve and has a first mating hole. A second gap exists between an inner wall surface of the first mating hole and the outer peripheral surface of the pin shaft. The second pole piece is arranged at the other end of the sleeve and has a second mating hole. A third gap exists between an inner wall surface of the second mating hole and the outer peripheral surface of the pin shaft.

10 Claims, 1 Drawing Sheet

(56) References Cited

U.S. PATENT DOCUMENTS

2011/0248449 A1* 10/2011 Li ............................ F16J 15/43
  277/302
2011/0294616 A1* 12/2011 Fujiwara ................. F16G 13/06
  474/207

FOREIGN PATENT DOCUMENTS

| CN | 108999932 | 12/2018 |
| CN | 109595344 | 4/2019 |
| CN | 109835660 | 6/2019 |

OTHER PUBLICATIONS

CNIPA, Notification to Grant Patent Right for Invention for CN Application No. 202011173662.0, Jun. 24, 2021.

* cited by examiner

CHAIN UNIT SEALED AND LUBRICATED WITH MAGNETIC FLUID AND CHAIN HAVING SAME

CROSS-REFERENCE TO RELATED APPLICATIONS

This application is based on and claims priority to Chinese Application No. 202011173662.0 and No. 202022440647.X, both filed on Oct. 28, 2020, the entire contents of which are incorporated herein by reference.

FIELD

This application relates to the field of hinges and, more particularly, to a chain unit sealed and lubricated with magnetic fluid and a chain having the same.

BACKGROUND

Chain drive is widely used in power transmission of various machines in agriculture, mining, transportation, textile, food and so on. The chains used in mining and transportation are prone to chain failure such as wear, lengthening of chain units, disengagement of teeth, and disconnection from chain due to the dusty environment and harsh working conditions, and the chains vibrate and shock severely during operation, generating a lot of noise. In order to reduce the wear, improve the smoothness of transmission, lower the noise during operation of the chains and prolong the service life of the chains, it is necessary to adopt sealing and lubrication measures for the chains.

In the related art, traditional lubrication oil is often used to lubricate the hinges, which has the problems of oil leakage, poor lubrication effect, hinge wear and failure, and is not conducive to the work of the chains in, for example, dusty environment.

SUMMARY

A chain unit lubricated and sealed with magnetic fluid includes: a pin shaft; a magnetic sleeve fitted over an outer periphery of the pin shaft, both ends of the pin shaft protruding from the sleeve, and a first gap being formed between an inner peripheral surface of the sleeve and an outer peripheral surface of the pin shaft; a first pole piece arranged at one of the sleeve and having a first mating hole, one of the pin shaft passing through the first pole piece via the first mating hole, and a second gap being formed between an inner wall surface of the first mating hole and the outer peripheral surface of the pin shaft; and a second pole piece arranged at the other end of the sleeve and having a second mating hole, the other end of the pin shaft passing through the second pole piece via the second mating hole, and a third gap being formed between an inner wall surface of the second mating hole and the outer peripheral surface of the pin shaft. The third gap is in communication with the first gap and the first gap is in communication with the second gap to form a cavity, and the magnetic fluid is filled in the cavity.

A chain includes a plurality of chain units connected sequentially. The chain units are lubricated and sealed with magnetic fluid. Each of the chain units includes: a pin shaft; a magnetic sleeve fitted over an outer periphery of the pin shaft, both ends of the pin shaft protruding from the sleeve, and a first gap being formed between an inner peripheral surface of the sleeve and an outer peripheral surface of the pin shaft; a first pole piece arranged at one of the sleeve and having a first mating hole, one of the pin shaft passing through the first pole piece via the first mating hole, and a second gap being formed between an inner wall surface of the first mating hole and the outer peripheral surface of the pin shaft; and a second pole piece arranged at the other end of the sleeve and having a second mating hole, the other end of the pin shaft passing through the second pole piece via the second mating hole, and a third gap being formed between an inner wall surface of the second mating hole and the outer peripheral surface of the pin shaft. The third gap is in communication with the first gap and the first gap is in communication with the second gap to form a cavity, and the magnetic fluid is filled in the cavity.

Figure 1:
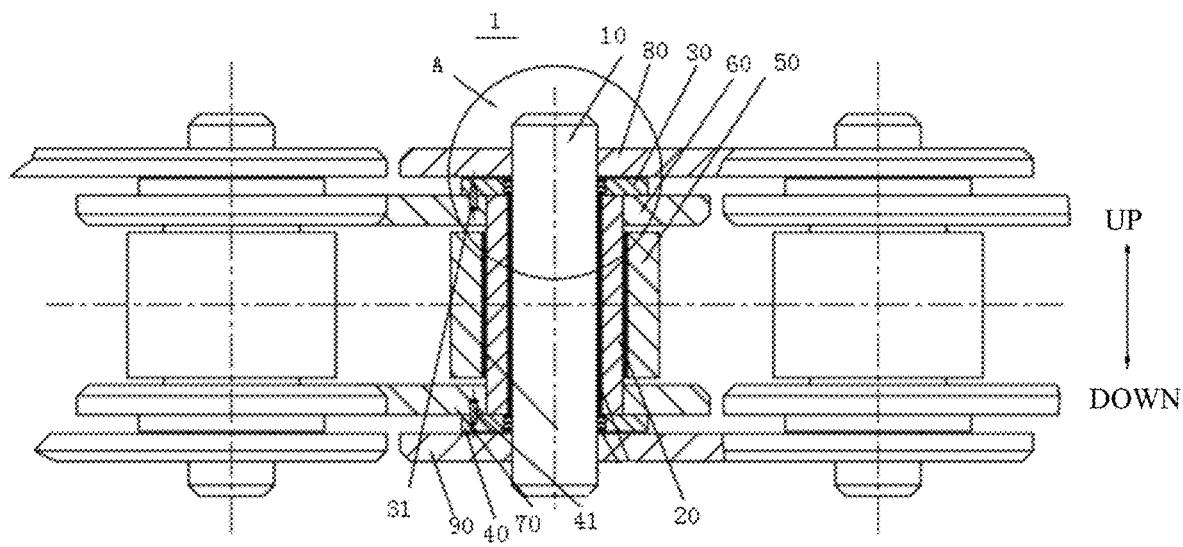
FIG. 1 is a schematic diagram of a chain unit lubricated and sealed with magnetic fluid according to an embodiment of the present disclosure.

REFERENCE NUMERALS chain unit 1 lubricated and sealed with magnetic fluid;
pin shaft 10;
sleeve 20;
first pole piece 30; first connection member 31;
second pole piece 40; second connection member 41;
roller 50;
first inner plate 60;
second inner plate 70;
first outer plate 80;
second outer plate 90.

DETAILED DESCRIPTION

Embodiments of the present disclosure are described in detail below, and examples of the described embodiments are shown in accompanying drawings. The following embodiments described with reference to the accompanying drawings are exemplary and are intended to explain the present disclosure rather than limit the present disclosure.

Figure 2:
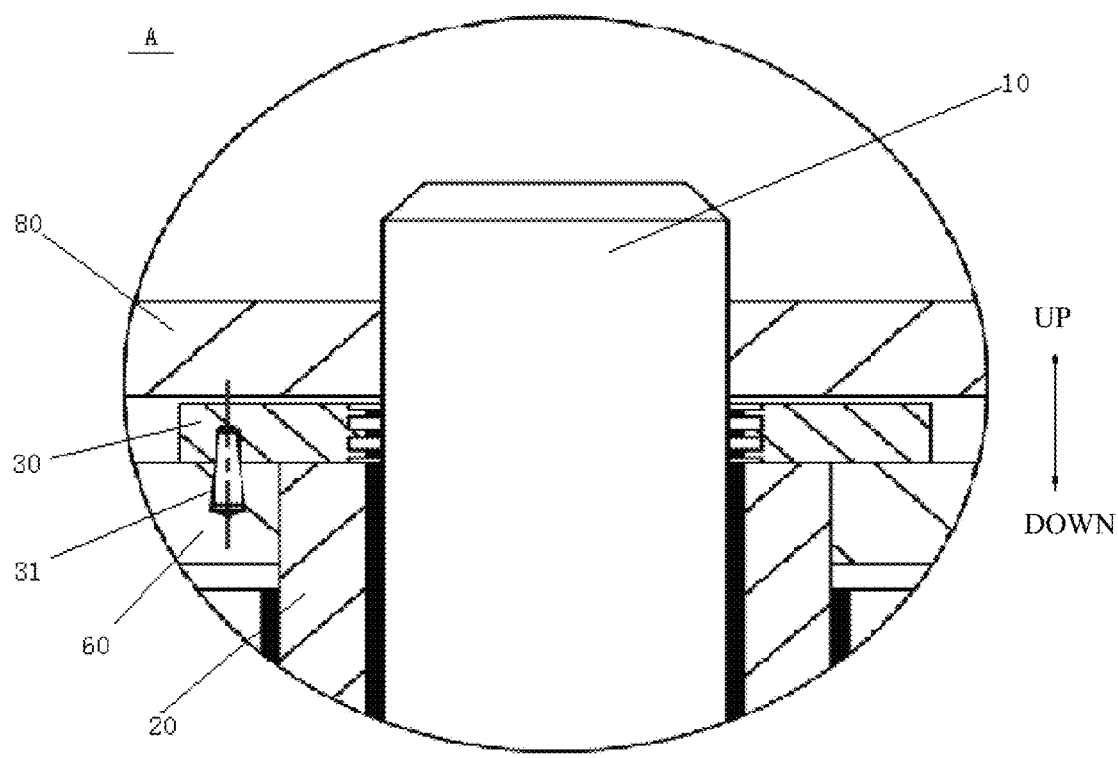
FIG. 2 is an enlarged view of part A in FIG. 1.

As shown in FIGS. 1 and 2, a chain unit 1 lubricated and sealed with magnetic fluid according to embodiments of the present disclosure includes a pin shaft 10, a magnetic sleeve 20, a first pole piece 30, and a second pole piece 40.

The sleeve 20 is fitted over an outer periphery of the pin shaft 10; both ends of the pin shaft 10 protrude from the sleeve 20; and a first gap exists between an inner peripheral surface of the sleeve 20 and an outer peripheral surface of the pin shaft 10. As shown in FIG. 1, the pin shaft 10 is fitted inside the sleeve 20; upper and lower ends of the pin shaft 10 protrude from the sleeve 20; and the inner peripheral surface of the sleeve 20 is spaced apart from the outer peripheral surface of the pin shaft 10 in a radial direction of the pin shaft 10.

The first pole piece 30 is arranged at one end of the sleeve 20 and has a first mating hole, one end of the pin shaft 10 passes through the first pole piece 30 via the first mating hole, and a second gap exists between an inner wall surface of the first mating hole and the outer peripheral surface of the pin shaft 10. The second pole piece 40 is arranged at the other end of the sleeve 20 and has a second mating hole, the other end of the pin shaft 10 passes through the second pole piece 40 via the second mating hole, and a third gap exists between an inner wall surface of the second mating hole and the outer peripheral surface of the pin shaft 10. The third gap is in communication with the first gap and the first gap is in communication with the second gap to form a cavity, and the magnetic fluid is filled in the cavity.

As shown in FIG. 1, the first pole piece 30 is arranged at an upper end of the sleeve 20, and a lower surface of the first pole piece 30 adheres to an upper surface of the sleeve 20; the second pole piece 40 is arranged at a lower end of the sleeve 20, and an upper surface of the second pole piece 40 adheres to a lower surface of the sleeve 20. In this way, both the first pole piece 30 and the second pole piece 40 can be connected to the sleeve 20 in a sealing manner. The upper end of the pin shaft 10 passes through the first mating hole, and the lower end of the pin shaft 10 passes through the second mating hole; the second gap is located above the first gap and the third gap is located below the first gap; and the magnetic fluid in the second gap and the third gap can seal the chain unit to prevent external impurities from entering the chain unit and avoid leakage of the magnetic fluid in the first gap.

It can be understood that the sleeve 20, the first pole piece 30 and the second pole piece 40 are rotatable relative to the pin shaft 10, and in some embodiments, both the first pole piece 30 and the second pole piece 40 are fixedly connected to the sleeve 20 to ensure sealing performance between the first pole piece 30 and the sleeve 20 and between the second pole piece 40 and the sleeve 20 to avoid the leakage of the magnetic fluid.

The inventors have found after research that, compared with the traditional lubrication oil, an oil film of the magnetic fluid has high bearing capacity, and magnetic particles are equivalent to miniature balls, which can play a role in reducing friction. In addition, the magnetic fluid can also provide support between relatively stationary friction pairs, further preventing friction or collision between various parts (such as between the pin shaft and the sleeve) and improving the effect of vibration reduction and wear resistance.

For the chain unit lubricated and sealed with the magnetic fluid according to embodiments of the present disclosure, by providing the magnetic sleeve and injecting the magnetic fluid into the cavity around the pin shaft, the magnetic fluid can be adsorbed in desired positions by using a magnetic field generated by the sleeve to avoid the leakage of the magnetic fluid, and the gap space inside the chain unit can be sealed by the magnetic fluid to prevent external impurities from eroding the chain unit, reduce operation noise of the chain unit, realize steady transmission of the chain unit, make the chain unit wear-resistant, and prolong the service life of the chain unit.

Further, each of the first gap, the second gap and the third gap has a dimension of 0.001 to 1 mm in the radial direction of the pin shaft 10, which can prevent the parts (such as the pin shaft, the sleeve, the first pole piece and the second pole piece) from colliding or rubbing, and make the chain unit compact and sensitive in transmission.

In some embodiments, as shown in FIG. 1, the chain unit 1 lubricated and sealed with the magnetic fluid also includes a roller 50 fitted over an outer periphery of the sleeve 20; a fourth gap exists between an inner peripheral surface of the roller 50 and an outer peripheral surface of the sleeve 20, and the magnetic fluid is filled in the fourth gap; the roller 50 and the first pole piece 30 are spaced apart from each other in a length direction of the pin shaft 10, and the roller 50 and the second pole piece 40 are spaced apart from each other in the length direction of the pin shaft 10.

As shown in FIG. 1, the first pole piece 30 is located above the roller 50, the second pole piece 40 is located below the roller 50, the first pole piece 30 is spaced apart from an upper end of the roller 50 in an up-down direction, and the second pole piece 40 is spaced apart from a lower end of the roller 50 in the up-down direction. As a result, the roller is not in contact with both the first pole piece and the second pole piece, the roller can be rotated relative to the sleeve, and the magnetic fluid in the fourth gap can play a role of lubrication and reduce the probability of contact friction between the roller and the sleeve.

In some embodiments, as shown in FIG. 1, the chain unit 1 lubricated and sealed with the magnetic fluid further includes a first inner plate 60 and a second inner plate 70; the first inner plate 60 and the second inner plate 70 are arranged oppositely and spaced apart from each other along the length direction of the pin shaft 10 (the up-down direction in FIG. 1); the first inner plate 60 and the second inner plate 70 are arranged between the first pole piece 30 and the second pole piece 40; the first inner plate 60 adheres to the first pole piece 30, and the second inner plate 70 adheres to the second pole piece 40.

As shown in FIG. 1, the first inner plate 60 is arranged below the first pole piece 30, and an upper surface of the first inner plate 60 adheres to the lower surface of the first pole piece 30 to make a seal between the first inner plate 60 and the first pole piece 30; the second inner plate 70 is arranged above the second pole piece 40, and a lower surface of the second inner plate 70 adheres to the upper surface of the second pole piece 40 to make a seal between the second inner plate 70 and the second pole piece 40.

The first inner plate 60 is provided with a first through-hole (not shown) and one end of the sleeve 20 is fitted in the first through-hole; the second inner plate 70 is provided with a second through-hole (not shown) and the other end of the sleeve 20 is fitted in the second through-hole. In some embodiments, the first inner plate 60 has a first through-hole running through the first inner plate 60 in the up-down direction, the second inner plate 70 has a second through-hole running through the second inner plate 70 in the up-down direction, the upper end of the sleeve 20 is fitted in the first through-hole, and the lower end of the sleeve 20 is fitted in the second through-hole.

In some embodiments, the chain unit 1 lubricated and sealed with the magnetic fluid further includes a first outer plate 80 and a second outer plate 90, the first outer plate 80 is arranged on a side of the first pole piece 30 away from the first inner plate 60, and the second outer plate 90 is arranged on a side of the second pole piece 40 away from the second inner plate 70.

As shown in FIG. 1, the first outer plate 80 is located above the first pole piece 30, and the first outer plate 80 is spaced apart from the first pole piece 30 in the up-down direction; the second outer plate 90 is located below the second pole piece 40, and the second outer plate 90 is spaced apart from the second pole piece 40 in the up-down direction. As a result, the first outer plate 80 does not interfere with rotation of the first pole piece 30 and the second outer plate 90 does not interfere with rotation of the second pole piece 40.

Further, the first outer plate 80 is provided with a third through-hole (not shown) and the second outer plate 90 is provided with a fourth through-hole (not shown); one end of the pin shaft 10 passes through the first outer plate 80 via the third through-hole, and the other end of the pin shaft 10 passes through the second outer plate 90 via the fourth through-hole.

In some embodiments, the third through-hole runs through the first outer plate 80 in the up-down direction, and the fourth through-hole runs through the second outer plate 90 in the up-down direction. The upper end of the pin shaft 10 passes through the third through-hole, and a part of the pin shaft 10 located inside the third through-hole is in interference fit with the first outer plate 80, so that the first outer plate 80 is connected and fastened to the pin shaft 10. The lower end of the pin shaft 10 passes through the fourth through-hole, and a part of the pin shaft 10 located inside the fourth through-hole is in interference fit with the second outer plate 90, so that the second outer plate 90 is connected and fastened to the pin shaft 10.

In some embodiments, as shown in FIG. 1, the chain unit 1 lubricated and sealed with the magnetic fluid also includes a first connection member 31 and a second connection member 41, the first connection member 31 connecting the first inner plate 60 and the first pole piece 30, and the second connection member 41 connecting the second inner plate 70 and the second pole piece 40.

In some embodiments, as shown in FIG. 1, the first pole piece 30 has a first connection hole (not shown) extending along its thickness direction (the up-down direction as shown in FIG. 1); the first inner plate 60 has a second connection hole (not shown) extending along its thickness direction (the up-down direction as shown in FIG. 1); the first connection hole is opposite to the second connection hole; and one end of the first connection member 31 is fitted in the first connection hole, and the other end of the first connection member 31 is fitted in the second connection hole. In other words, the first pole piece 30 and the first inner plate 60 are connected as an integral part by the first connection member 31, i.e., the first pole piece 30 and the first inner plate 60 cannot be rotated relative to each other, thus reducing the probability of the leakage of the magnetic fluid.

As shown in FIG. 1, the first connection hole extending upward is formed on the lower surface of the first pole piece 30, the second connection hole extending downward is formed on the upper surface of the first inner plate 60, and an opening of the first connection hole is opposite to an opening of the second connection hole. An upper end of the first connection member 31 extends into the first connection hole, and a lower end of the first connection member 31 extends into the second connection hole to connect the first pole piece 30 with the first inner plate 60.

The second pole piece 40 has a third connection hole (not shown) extending along its thickness direction (the up-down direction as shown in FIG. 1), the second inner plate 70 has a fourth connection hole (not shown) extending along its thickness direction (the up-down direction as shown in FIG. 1), and the third connection hole is opposite to the fourth connection hole. One end of the second connection member 41 is fitted in the third connection hole, and the other end of the second connection member 41 is fitted in the fourth connection hole. In other words, the second pole piece 40 and the second inner plate 70 are connected as an integral part by the second connection member 41, i.e., the second pole piece 40 and the second inner plate 70 cannot be rotated relative to each other, thus reducing the probability of the leakage of the magnetic fluid.

As shown in FIG. 1, the third connection hole extending downward is formed on the upper surface of the second pole piece 40, the fourth connection hole extending upward is formed on the lower surface of the second inner plate 70, and an opening of the third connection hole is opposite to an opening of the fourth connection hole. A lower end of the second connection member 41 extends into the third connection hole, and an upper end of the second connection member 41 extends into the fourth connection hole to connect the second pole piece 40 with the second inner plate 70.

In some embodiments, the first inner plate 60, the second inner plate 70, the roller 50, the first connection member 31, the second connection member 41, the first outer plate 80, and the second outer plate 90 are all made of magnetically non-conductive materials, which can prevent the first inner plate, the second inner plate, the roller, the first connection member, the second connection member, the first outer plate and the second outer plate from being magnetized and avoid magnetic flux leakage.

In some embodiments, the sleeve 20 is made of a permanent magnet material and can adsorb the magnetic fluid in the first gap, the second gap, and the third gap; and the first pole piece 30, the second pole piece 40, and the pin shaft 10 are made of magnetically conductive materials. As a result, the sleeve, the first pole piece, the pin shaft, the second pole piece, and the magnetic fluid can form a closed magnetic circuit to improve reliability of absorption of the magnetic fluid by the magnetic field.

A chain according to embodiments of the present disclosure includes a plurality of the above chain units connected sequentially, and by using the above chain units, the chain operates with low vibration, is not easily worn, and has a long service life.

The chain unit 1 lubricated and sealed with the magnetic fluid according to a specific example of the present disclosure will be described below with reference to FIGS. 1-2.

As shown in FIG. 1, the chain unit 1 lubricated and sealed with the magnetic fluid includes a pin shaft 10, a sleeve 20, a roller 50, a first pole piece 30, a first inner plate 60, a first outer plate 80, a second pole piece 40, a second inner plate 70, a second outer plate 90, a first connection member 31 and a second connection member 41.

The sleeve 20, the first pole piece 30, the second pole piece 40, the first outer plate 80, and the second outer plate 90 are all fitted over the pin shaft 10. A first gap is formed between an inner peripheral surface of the sleeve 20 and an outer peripheral surface of the pin shaft 10. The first pole piece 30 has a first through-hole running through the first pole piece 30 in an up-down direction, and an upper end of the pin shaft 10 passes through the first through-hole. A second gap is formed between an inner peripheral surface of the first through-hole and the outer peripheral surface of the pin shaft 10. The second pole piece 40 has a second through-hole running through the second pole piece 40 in the up-down direction, and a lower end of the pin shaft 10 passes through the second through-hole. A third gap is formed between an inner peripheral surface of the second through-hole and the outer peripheral surface of the pin shaft 10. The first gap is in communication with the second gap, and the first gap is in communication with the third gap.

The sleeve 20 is located between the first pole piece 30 and the second pole piece 40, the first pole piece 30 is located above the sleeve 20, and the second pole piece 40 is located below the sleeve 20. The first outer plate 80 is located above the first pole piece 30, and the second outer plate 90 is located below the second pole piece 40. The first inner plate 60 is fitted over an upper end of the sleeve 20 and is in interference fit with the sleeve 20. The second inner plate 70 is fitted over a lower end of the sleeve 20 and is in interference fit with the sleeve 20. An upper surface of the first inner plate 60 adheres to a lower surface of the first pole piece 30, and a lower surface of the second inner plate 70 adheres to an upper surface of the second pole piece 40.

The lower surface of the first pole piece 30 is recessed upward to form a first connection hole, and the upper surface of the first inner plate 60 is recessed downward to form a second connection hole. An upper end of the first connection member 31 extends into the first connection hole, and a lower end of the first connection member 31 extends into the second connection hole.

The upper surface of the second pole piece 40 is recessed downward to form a third connection hole, and the lower surface of the second inner plate 70 is recessed upward to form a fourth connection hole. An upper end of the second connection member 41 extends into the fourth connection hole, and a lower end of the second connection member 41 extends into the third connection hole.

The roller 50 is fitted over the sleeve 20, and a fourth gap is formed between an inner peripheral surface of the roller 50 and an outer peripheral surface of the sleeve 20. The first inner plate 60 is located at the upper end of the sleeve 20, and the second inner plate 70 is located at the lower end of the sleeve 20. The first inner plate 60 is spaced apart from an upper end of the roller 50 in the up-down direction, and the second inner plate 70 is spaced apart from a lower end of the roller 50 in the up-down direction.

In the description of the present disclosure, it shall be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation as then described or as shown in the drawings under discussion. These relative terms are for convenience and simplification of description and do not indicate or imply that the device or element referred to must have a particular orientation, or be constructed and operated in a particular orientation. Thus, these terms shall not be construed as limitation on the present disclosure.

In addition, terms such as "first" and "second" are merely used for descriptive purposes and cannot be understood as indicating or implying relative importance or the number of technical features indicated. Thus, the features defined with "first" and "second" may explicitly or implicitly include at least one of the features. In the description of the present disclosure, unless otherwise specifically defined, "a plurality of" means at least two, such as two, three, etc.

In the present disclosure, unless otherwise explicitly specified and defined, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction between two elements, which can be understood by those skilled in the art according to specific situations.

In the present disclosure, unless otherwise explicitly specified and defined, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, terms such as "an embodiment," "some embodiments," "an example," "a specific example," or "some examples," means that a particular feature, structure, material, or characteristic described in connection with the embodiment or example is included in at least one embodiment or example of the present disclosure. Thus, the appearances of these terms in various places throughout this specification are not necessarily referring to the same embodiment or example of the present disclosure. Furthermore, the particular features, structures, materials, or characteristics may be combined in any suitable manner in one or more embodiments or examples. In addition, without contradiction, those skilled in the art may combine and unite different embodiments or examples or features of the different embodiments or examples described in this specification.

Although the embodiments of the present disclosure have been shown and described above, it can be understood that the above embodiments are exemplary and shall not be understood as limitation on the present disclosure, and changes, modifications, alternatives and variations can be made in the above embodiments within the scope of the present disclosure.

What is claimed is:

1. A chain unit lubricated and sealed with magnetic fluid, comprising:
    a pin shaft;
    a magnetic sleeve fitted over an outer periphery of the pin shaft, both ends of the pin shaft protruding from the sleeve, and a first gap being formed between an inner peripheral surface of the sleeve and an outer peripheral surface of the pin shaft;
    a first inner plate having a first through-hole, one end of the sleeve being fitted and connected in the first through-hole;
    a second inner plate having a second through-hole, the other end of the sleeve being fitted and connected in the second through-hole;
    a first pole piece arranged at one of the sleeve and having a first mating hole, one end of the pin shaft passing through the first pole piece via the first mating hole, and a second gap being formed between an inner wall surface of the first mating hole and the outer peripheral surface of the pin shaft; and
    a second pole piece arranged at the other end of the sleeve and having a second mating hole, the other end of the pin shaft passing through the second pole piece via the second mating hole, and a third gap being formed between an inner wall surface of the second mating hole and the outer peripheral surface of the pin shaft,
    wherein the third gap is in communication with the first gap and the first gap is in communication with the second gap to form a cavity, and the magnetic fluid is filled in the cavity.

2. The chain unit according to claim 1, further comprising a roller fitted over an outer periphery of the sleeve, wherein:
    a fourth gap is formed between an inner peripheral surface of the roller and an outer peripheral surface of the sleeve, and the magnetic fluid is filled in the fourth gap; and the roller and the first pole piece are spaced apart from each other in a length direction of the pin shaft, and the roller and the second pole piece are spaced apart from each other in the length direction of the pin shaft.

3. The chain unit according to claim 2, a wherein the first inner plate and the second inner plate arranged opposite to each other and spaced apart from each other along the length direction of the pin shaft; and, the first inner plate and the second inner plate are arranged between the first pole piece and the second pole piece, the first inner plate adhering to the first pole piece, and the second inner plate adhering to the second pole piece.

4. The chain unit according to claim 3, further comprising:
a first outer plate arranged on a side of the first pole piece away from the first inner plate, and having a third through-hole; and
a second outer plate arranged on a side of the second pole piece away from the second inner plate, and having a fourth through-hole;
wherein one end of the pin shaft passes through the first outer plate via the third through-hole, and the other end of the pin shaft passes through the second outer plate via the fourth through-hole.

5. The chain unit according to claim 4, further comprising:
a first connection member connecting the first inner plate with the first pole piece; and
a second connection member connecting the second inner plate with the second pole piece.

6. The chain unit according to claim 5, wherein:
the first pole piece has a first connection hole extending along a thickness direction of the first pole piece, the first inner plate has a second connection hole extending along a thickness direction of the first inner plate, and the first connection hole is opposite to the second connection hole, one end of the first connection member being fitted in the first connection hole, and the other end of the first connection member being fitted in the second connection hole; and
the second pole piece has a third connection hole extending along a thickness direction of the second pole piece, the second inner plate has a fourth connection hole extending along a thickness direction of the second inner plate, and the third connection hole is opposite to the fourth connection hole, one end of the second connection member being fitted in the third connection hole, and the other end of the second connection member being fitted in the fourth connection hole.

7. The chain unit according to claim 5, wherein the first inner plate, the second inner plate, the roller, the first connection member, the second connection member, the first outer plate, and the second outer plate are all made of magnetically non-conductive materials.

8. The chain unit according to claim 1, wherein the first pole piece, the second pole piece, and the pin shaft are all made of magnetically conductive materials.

9. The chain unit according to claim 1, wherein the sleeve is made of a permanent magnet material.

10. A chain comprising a plurality of chain units connected in sequence, wherein the plurality of chain units are lubricated and sealed with magnetic fluid, and each of the plurality of chain units comprises:
a pin shaft;
a magnetic sleeve fitted over an outer periphery of the pin shaft, both ends of the pin shaft protruding from the sleeve, and a first gap being formed between an inner peripheral surface of the sleeve and an outer peripheral surface of the pin shaft;
a first inner plate having a first through-hole, one end of the sleeve being fitted and connected in the first through-hole;
a second inner plate having a second through-hole, the other end of the sleeve being fitted and connected in the second through-hole;
a first pole piece arranged at one of the sleeve and having a first mating hole, one of the pin shaft passing through the first pole piece via the first mating hole, and a second gap being formed between an inner wall surface of the first mating hole and the outer peripheral surface of the pin shaft; and
a second pole piece arranged at the other end of the sleeve and having a second mating hole, the other end of the pin shaft passing through the second pole piece via the second mating hole, and a third gap being formed between an inner wall surface of the second mating hole and the outer peripheral surface of the pin shaft,
wherein the third gap is in communication with the first gap and the first gap is in communication with the second gap to form a cavity, and the magnetic fluid is filled in the cavity.

* * * * *